June 1, 1965 G. D. CHENEY 3,187,315

POSITIONING APPARATUS FOR MAGNETIC HEADS IN RECORDING DEVICES

Filed June 21, 1960

2 Sheets-Sheet 1

INVENTOR.

GEORGE D. CHENEY

BY James H. Bower

ATTORNEY

INVENTOR.
GEORGE D. CHENEY
BY James H. Bower
ATTORNEY

United States Patent Office 3,187,315
Patented June 1, 1965

3,187,315

POSITIONING APPARATUS FOR MAGNETIC HEADS IN RECORDING DEVICES

George D. Cheney, Walpole, N.H., assignor, by mesne assignments, to Ex-Cell-O Corporation, Detroit, Mich., a corporation of Michigan Filed June 21, 1960, Ser. No. 37,688
7 Claims. (Cl. 340—174.1)

This invention relates to a novel apparatus for holding and locating a magnetic transducer head a selected distance away from a rapidly moving surface. The device is particularly, although not exclusively, adapted for use in connection with magnetic drums or discs commonly used as memory storage devices for computing machines.

In magnetic data storage devices of the type which have a generally movable record body with a magnetizable surface layer and one or more transducer heads positioned adjacent thereto, it is necessary to accurately maintain a constant predetermined air-gap spacing between the tip of the transducer head and the surface of the movable record medium. As a general rule, narrow air-gap spacing results in better recording on and readout with the device and, hence, some magnetic data storage devices utilize an air-gap spacing less than a thousandth of an inch. The desired predetermined air-gap spacing must be maintained constant in operation in order to achieve desirable constant signal level during recording and readout. Eccentricity, wobble, and runout of rotary parts, such as the record medium, as well as thermal expansion, have caused difficulty in establishing and maintaining the desired constant air-gap spacing during dynamic conditions.

In a copending application of Joseph E. Smith, Jr., Serial No. 772,861, assigned to the assignee of this invention, there is disclosed an automatic air-gap spacing arrangement for transducer heads utilizing the hydrodynamic forces that are present during the operation of the device and having no external control medium. The subject invention is also utilizing hydrodynamic forces, one of its objects being to provide closer gap positioning of a magnetic transducer head to a relatively moving surface.

Another object of the present invention is to control the air-gap spacing by means of balancing the forces acting simultaneously on the transducer head.

A further object of this invention is to provide a means of holding one or more heads in spaced relation with respect to a moving surface which allows a dual adjustment for each individual head, one adjustment being to position its head circumferentially, and the other being able to position its head radially to facilitate automatic air-gap spacing when the surface is in motion. Another object of this invention is to have the head withdraw automatically when the surface is stationary in respect to the transducer head.

It is a further object of this invention to provide a transducer head that is substantially not sensitive to temperature change and has high shock characteristics.

An additional object of the invention is to construct a transducer head having the ability to maintain small gap spacing with a magnetic surface and being substantially immune to vibration.

An additional object is to provide a magnetic head which will have reduced inductance and higher resonant frequency response.

Also, the objects of the present invention include the provision of a structure capable of accomplishing the above objects with a minimum of material cost and fabricating expense and, at the same time, being composed of simply and ruggedly constructed elements which are very reliable in operation.

Other objects and advantages of this invention will be apparent from the following detailed description and claims taken in connection with the accompanying drawings which form part of the instant specification, and which are to be read in conjunction therewith and in which like reference numerals are used to indicate like parts in the various views. In the drawings:

Figure 1:
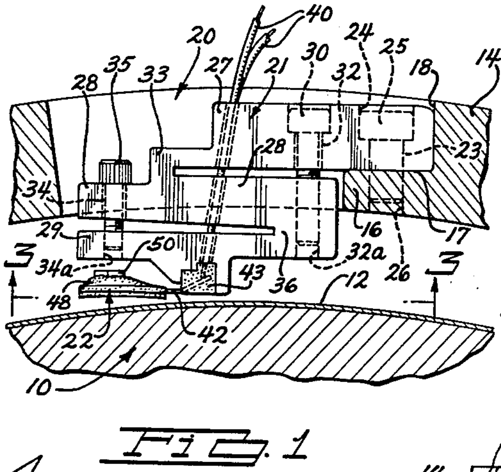
FIG. 1 is an elevation view, partly in section, showing a portion of a rotatable magnetizable record medium, a mounting bracket and a transducer head associated therewith when the device is in a static condition.

Briefly, this invention contemplates positioning a transducer head which is adjustably mounted and normally biased to a position away from the surface of a record medium. This transducer may be one of several associated with a movable record storage medium, such as a magnetic drum or disc, and having a pair of stepped surfaces on both sides of its head adjacent the medium surface. During dynamic conditions when the recording surface is in motion, the biasing force of the springs will be overcome by the effect as predicted by the Bernoulli theory of fluids, thus causing the land, formed by the stepped surfaces, to ride on an air bearing of a laminar film adhering to the moving medium surface. The stepped surfaces act as nozzles and cause the Bernoulli effect, and the air bearing, which may be only a few molecules in thickness, opposes both the force of the Bernoulli effect and the spring force acting on the transducer head. During dynamic conditions, this desired and predetermined air-gap spacing is automatically maintained by the balancing of the said forces, and will remain constant during adverse conditions of wobble, runout, etc. During static conditions the biasing springs will hold the transducer in a "fail safe" position away from the surface of the record medium such that it will not come into physical contact therewith.

Referring to the drawings, and more particularly to FIGS. 1–4 thereof, there is shown a drum 10, with a magnetic coating 12 and a supporting housing 14. The supporting housing 14 includes a locating flange 16 and locating surfaces 17, 18, which support transducer unit 20. Transducer unit 20 has two major elements, mounting bracket 21 and transducer head 22. Mounting bracket 21 has bore 23 and countersink drawings but others may be provided as required. Bolt 25 is threaded and enters into threaded bore 26 of flange 16 and is tightened, thus securing the mounting bracket 21 to support housing 14. Mounting bracket 21 is generally made up of three major flanges 27, 28 and 29, with flange 27 being common to all heads, and each head having individual flanges 28 and 29. Flanges 27 and 28 house circumferential adjusting bolt 30, flange 27 has a bore 32, and flange 28 has a threaded bore 32*a*. Therefore, as threaded bolt 30 is turned to draw flange 28 towards flange 27, the transducer head 22 is moved toward the right, and if the bolt 30 is turned in the opposite direction, it will be moved toward the left around the drum surface. In both cases, flange 28 pivots about connecting section 33. After the transducer head 22 is in close proximity to its correct static position, positioned by flange 16, bolt 35 is used for fine radial adjustment of the transducer head. Flanges 28 and 29, housing threaded adjusting bolt 35, have bore 34 and thread bore 34*a* respectively. When bolt 35 is turned to draw flange 29 toward flange 28, pivoting about connecting section 36, the transducer head 22 is moved away from the drum surface 12, and when the bolt 35 is rotated in the reverse direction, the head 22 will be moved towards the drum surface 12. Flanges 27, 28 and 29 have bores 38*a*, 38*b* and 38*c* respectively, as in FIG. 5 which house lead wires 40, and allow them to reach leaf springs 42. Each lead wire is connected to one leaf spring. This is held in flange 29 by casting a non-conductive plastic type material around the union between lead wire and leaf spring and mounting this cast section 43 in groove 44 of flange 29.

Figure 3:
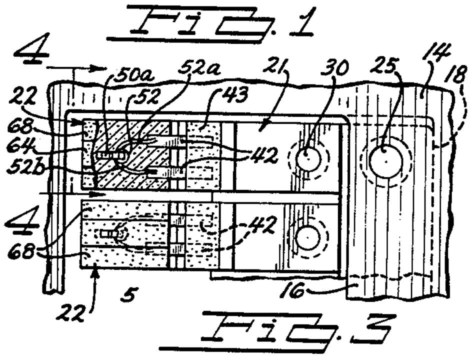
FIG. 3 is a bottom plan view, partly in section, taken along the line 3—3 of FIG. 1, showing a portion of the mounting bracket and transducer head positioned in a suitable carrier.
Figure 6:
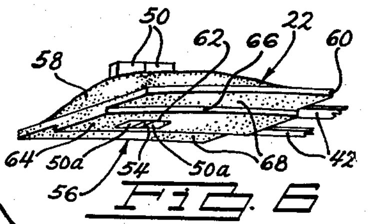
FIG. 6 is a perspective view of the transducer head showing the respective locations of its its bottom elements.

The transducer head 22 has two general elements, a magnetic transducer 46 and a head pad 48. The magnetic transducer 46 has a transducer core 51 made up of two pole pieces 50, and a transducer coil 52 having its coil wire ends 52*a* and 52*b* connected to one or the other of the leaf springs 42 as shown in FIG. 3. The pole pieces 50 are butted together at one end and are separated at the other end by shim 54, through which magnetic flux does not readily flow, such as silver or mica. Therefore, when transducer coil 52 is energized, the core 51 is polarized, with ends 50*a* of pole pieces 50 being either a north or a south pole, depending on the direction of current flow. The magnetic transducer 46 is cast in pad 48, which is a type of non-conductive material and could, for example, be plastic of the epoxy class. The pad 48 has two general parts, bottom portion 56 and upper portion 58. The upper portion is used to protect the union between the coil ends 52*a* and 52*b* and the leaf springs 42 and covers the major portion of the magnetic transducer 46 and holds it in correct position. The bottom portion 56, as shown in FIG. 6, has five elements, sides 60, pole end opening 62, land surface 64, steps 66 and step surfaces 68.

Figure 4:
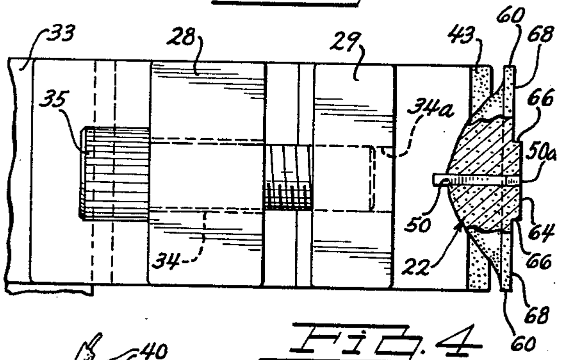
FIG. 4 is an enlarged front plan view, partly in section, taken along the line 4—4 of FIG. 3, showing one head of a series.
Figure 5:
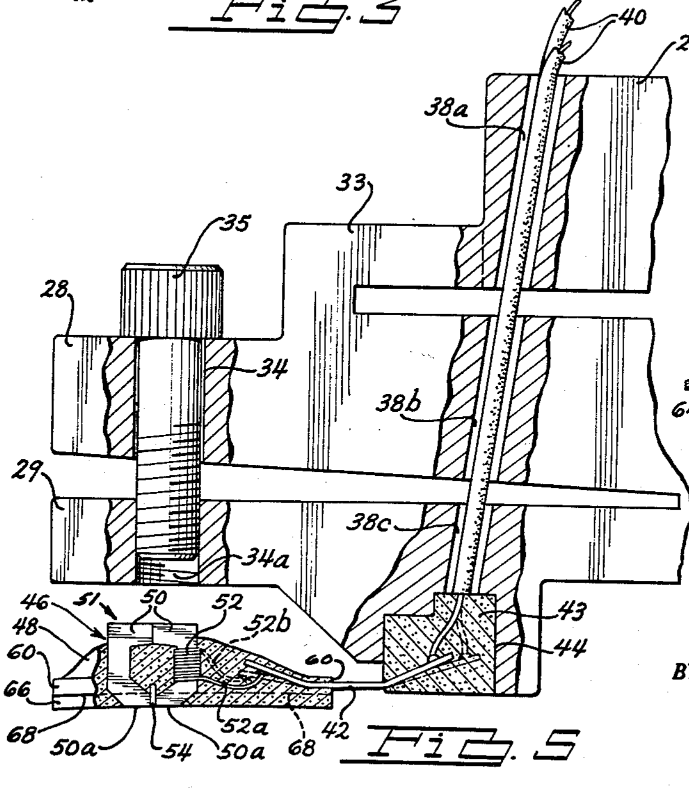
FIG. 5 is an enlarged elevation view, partly in section, similar to FIG. 1 but only showing the transducer head and the front portion of the mounting bracket.
Figure 7:
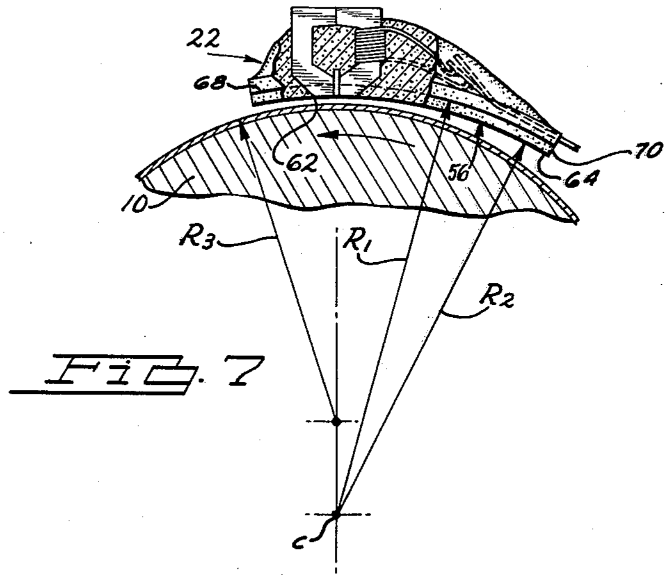
FIG. 7 is an elevation view, partly in section, showing the relationship of the drum and transducer head radii during dynamic conditions.

A front view of the head 22, as seen in FIG. 4, shows surfaces 68 and 64 to be straight lines, but a side view of the head 22, as seen in FIGS. 5 and 7, shows surfaces 68 and 64 to have curved surfaces which if projected out would prove to be cylinders. Therefore, surfaces 68 and 64 have a radii $R_1$ and $R_2$ respectively, with a common center *c*; thus, these surfaces are parallel. As seen in FIG. 5, the leaf springs 42 enter the pad 48 through a side 60. Leaf springs 42 are made of conductive material, such as stainless steel shim stock, and are connected to the lead wires 40 at one end and the coil wire ends 52*a* and 52*b* at the other end. The springs 42 are the means used to bring the electrical energy from the head wires 40 to the coil 52 for polarizing the core 51 as previously described.

Figure 2:
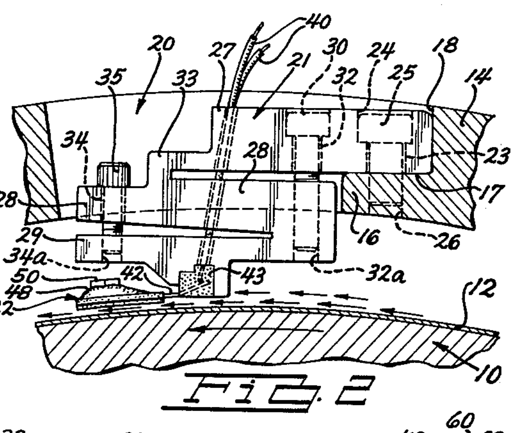
FIG. 2 is an elevation view, partly in section, similar to FIG. 1, showing the component parts when the record medium is in motion at operating speed, i.e., during dynamic conditions.

FIGS. 1 and 2 show the static and dynamic conditions respectively of the invention. In FIGS. 2 and 7 the head 22 and the drum 10 rotating counter-clockwise, approach a tangential position, with the closest air-gap at pole end opening 62. The radii of the surfaces 68 and 64 are larger than the radius $R_3$ of the drum 10. Therefore, as seen in FIG. 7, the air-gap between the drum 10 and head end 70 is larger in comparison to the drum 10 to head 22 air-gap at the pole end opening 62 location. The bottom portion 56 forms a nozzle effect which causes a pressure drop under the pad 48, and the atmospheric pressure on the upper portion 58 of the head 22 forces the head 22 towards the drum surface 12 in accordance with Bernoulli's theory.

Figure 8:
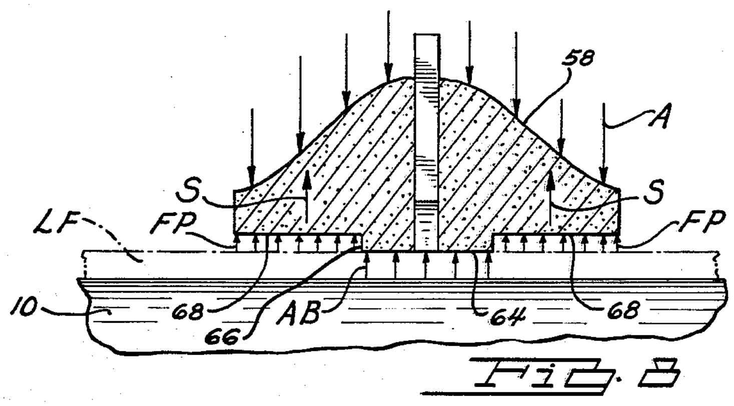
FIG. 8 is an elevation end view, partly in section, showing the forces acting on the transducer head in dynamic conditions.

FIG. 8 shows the static forces which act on the head 22 during dynamic conditions of the system. The force due to the ambient pressure A acts on the upper portion 58 of the head pad. The laminar film LF covers the surface of the drum 10 as it rotates.

As seen in FIG. 1, the system is in its static condition. As the drum starts to rotate, the air near the surface of the drum will tend to move with its surface. When this air passes under the head 22, it will cause a pressure drop between its static flow pressure FP and the ambient pressure due to its velocity difference. After sufficient speed is reached, the force A will overcome the resilient force S of the springs 42, due to the pressure drop under the head pad. The head pad will then move into operational position as shown in FIGS. 2, 7 and 8. The pressure drop developed between ambient pressure A and the static flow pressure FP during dynamic conditions is very large compared to the weight of the head pad. This tends to cause the land 64 to compress the laminar film LF, thus producing the air bearing AB on which it rides. When the head passes over any irregularities on the drum surface, which may be caused by thermal changes, surface eccentricity, physical characteristics and sundry other reasons, the land 64 continues to follow the surface at the predetermined air-gap spacing. Air flow changes caused by the irregularities are absorbed by the nozzle effect formed between the laminar film and the surfaces 68.

The stepped sections having surfaces 68 reduce the air bearing force without reducing the negative Bernoulli effect, which is the pressure drop between ambient pressure force A and static flow pressure force FP. This allows a constant predictable and extremely small air-gap spacing between the transducer head pad and the drum surface, which is not affected by ambient changes or irregularities in the drum's surface. It should be pointed out that FIG. 8 is merely a representation of the dynamic conditions and is not in correct proportion. In actual practice, the thickness of the laminar film LF would be in the order of .0002", and the step 66 would be in the order of .006".

In summarizing the static forces during dynamic conditions, it should be pointed out that the ambient pressure A acts down as viewed in FIG. 8, and is balanced by the upward resilient forces S of the leaf springs 42, the air bearing force AB acting on land surface 64, and the static flow pressure force FP acting on step surfaces 68.

Figure 9:
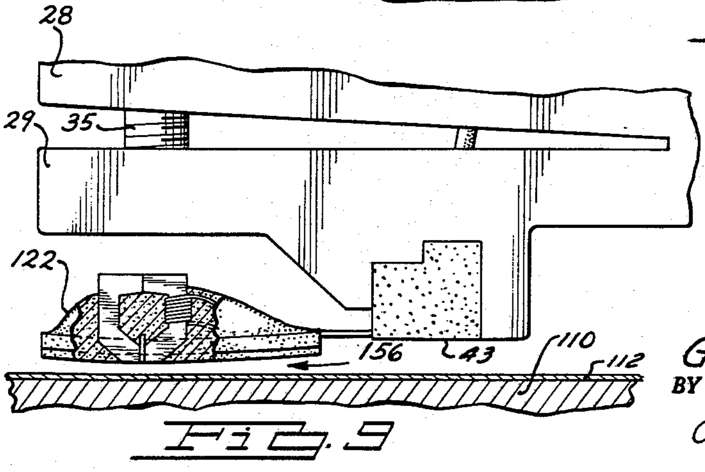
FIG. 9 is a diagrammatic view illustrating another embodiment of the transducer head during dynamic conditions, acting on a flat surface.

FIG. 9 is a variation of the preferred embodiment. The moving body 110 with a substantially flat magnetic coated surface 112 may be a disc with the heads located radially with respect to the axis of the disc. The moving body is flat and the head pad 122 has a convex bottom 156, as a modification from the preferred embodiment having a concave bottom 56 as shown in FIG. 7. The head pad 122 has an end view which appears the same as FIG. 8 and the same forces are appropriate.

The air-gap spacing is controlled and predicted by various conditions of the system, such as the speed of the magnetic recording surface, initial positioning of the head, etc. When a certain air-gap is required it can be obtained by changing the width of land 64 as seen in FIG. 8. When the land width is decreased, it will limit the force the laminar film may exert on the head. Thus, allowing the magnetic transducer to maintain a closer air-gap with respect to the magnetic recording surface. If the land width is increased, it will allow the force the laminar film exerts to become larger, thus the magnetic transducer air-gap with respect to the magnetic recording surface will be larger.

It will be understood that the pad bottom surface 56 may be various combinations of step surfaces and lands. For example, the pad may consist of two lands having a step surface between.

It will be understood that certain features and sub-combinations are of utility and may be employed without reference to other features and sub-combinations. This is contemplated by and is within the scope of my claims. It is further obvious that various changes may be made in details within the scope of my claims without departing from the spirit of my invention. It is therefore to be understood that my invention is not to be limited to the specific details shown and described.

I claim:

1. In a recording apparatus, a magnetic transducer head mounted on a pad which is movable by hydrodynamic forces caused by the motion of fluid clinging to the surface of a movable record medium, said pad having a bearing surface adapted to confront said record medium and comprising at least one raised land surface and one recessed surface disposed so that the raised land surface extends from end to end of said bearing surface along the general direction of motion of said record member, biasing means normally urging said pad away from said record medium while still maintaining it in the stream of fluid clinging to the surface of said record medium in such a way as to cause a drop of ambient pressure between said bearing surface and said record medium surface, said drop of pressure causing said pad to be displaced to a position of equilibrium where said land surface is supported by a moving layer of fluid a minute distance away from said record medium surface.

2. In a magnetic recording apparatus comprising at least one magnetic transducer head adapted to record and read magnetic pulses recorded upon the magnetizable surface of a substantially fast moving record medium, an improved apparatus for automatically establishing and maintaining a narrow gap spacing between the pole tip of said transducer head and the magnetizable record medium, said apparatus comprising: a pad casing for said transducer head; a bearing surface on said pad casing adapted to confront said record medium and comprising an integral raised land portion surrounding said pole tip and two symmetrically disposed recessed side portions, said land portion being substantially axially aligned with the direction of motion of the record medium; means supporting said pad in spatial relationship with a support member adjustably mounted on the housing of said recording apparatus, said supporting means comprising a pair of parallel reed-like flat resilient metal members having one of their ends fastened to the support member and their other ends fastened to the pad casing and electrically connected to the coil of said transducer head; said supporting means normally biasing said pad casing away from the surface of the record medium while still maintaining the bearing surface of said pad casing in the stream of fluid clinging to and in motion with the surface of said record medium at such an angle and in such a way as to form a nozzle causing the stream of fluid flowing between said bearing surface and said record medium to be accelerated and to induce a drop of ambient pressure between said bearing surface and said record medium bringing said bearing surface into a predetermined close spacing with the surface of said record medium whereby the land portion of said pad bearing surface is supported upon a laminar layer of said fluid, the spacing between said land portion and said record medium being determined by the ratio of respective areas of said land and said recessed side portions and by the biasing force of said supporting means; and said supporting means automatically retracting the pad casing away from the record medium as soon as the velocity of said record medium decreases below a predetermined value.

3. An apparatus according to claim 2 wherein the record medium is on a rotatable drum and wherein the land portion and the recessed side portions of the pad casing bearing surface form concentric arcuate concave surfaces non-concentric with said drum and having radii larger than the radius of said drum.

4. An apparatus according to claim 2 wherein the record medium is on a rotatable disc and wherein the land portion and the recessed side portions of the pad casing bearing surface form concentric arcuate convex surfaces.

5. In a magnetic recording apparatus comprising at least one magnetic transducer head adapted to record and read magnetic pulses recorded upon the magnetizable surface of a substantially fast moving record medium, an improved apparatus for automatically establishing and maintaining a narrow gap spacing between the pole tip of said transducer head and the magnetizable record medium, said apparatus comprising: a pad casing for said transducer head; a bearing surface on said pad casing adapted to confront said record medium and comprising an integral raised land portion surrounding said pole tip and two symmetrically disposed recessed side portions, said land portion being substantially axially aligned with the direction of motion of the record medium; means supporting said pad in spatial relationship with a support member adjustably mounted on the housing of said recording apparatus, said supporting means comprising a pair of parallel reed-like flat resilient metal members having one of their ends fastened to the support member and their other ends fastened to the pad casing; said supporting means normally biasing said pad casing away from the surface of the record medium while still maintaining the bearing surface of said pad casing in the stream of fluid clinging to and in motion with the surface of said record medium in such a way as to form a nozzle causing the stream of fluid flowing between said bearing surface and said record medium to be accelerated and to induce a drop of ambient pressure between said bearing surface and said record medium bringing said bearing surface into a predetermined close spacing with the surface of said record medium whereby the land portion of said bearing surface is supported upon a laminar layer of said fluid; and said supporting means automatically retracting the pad casing away from the record medium as soon as the velocity of said record medium decreases below a predetermined value.

6. An apparatus for poising a magnetic transducer head a predetermined distance away from a record medium during static conditions and for automatically positioning said magnetic transducer head with the flux emitting gap of its pole piece in close proximity to said record medium during dynamic conditions, said apparatus comprising: a pad number supporting said transducer head; a stepped bearing surface on said pad member comprising a raised land portion and two symmmetrically disposed recessed portions, said land portion being substantially aligned with the direction of motion of said record medium; resilient means normally biasing said pad member away from said record medium during static condition; means for causing an acceleration of the velocity of the flow of fluid clinging to and set in motion by said record medium during dynamic conditions, said means consisting of having said stepped bearing surface and said record medium form a nozzle therebetween, said acceleration of fluid flow causing a drop of ambient pressure under said stepped bearing surface that brings said pad member to a position of close proximity to the record medium, said stepped bearing surface being supported by a thin film of fluid clinging to said record medium.

7. In a recording apparatus, a magnetic transducer head mounted on a pad which is movable by hydrodynamic forces caused by the motion of fluid clinging to the surface of a movable record medium, said pad having a bearing surface adapted to confront said record medium and comprising two recessed surfaces separated by a raised land surface disposed so that the land surface extends from end to end of said bearing surface along the general direction of motion of said record member, biasing means normally urging said pad away from said record medium while still maintaining it in the stream of fluid clinging to the surface of said record medium in such a way as to cause a drop of ambient pressure between said bearing surface and said record medium surface, said drop of pressure causing said pad to be displaced to a position of equilibrium where said land surface is supported by a moving layer of fluid a minute distance away from said record medium surface.

References Cited by the Examiner

UNITED STATES PATENTS

| | | | |
|---|---|---|---|
| 2,708,693 | 5/55 | Hendrickson | 179—100.2 |
| 2,862,781 | 12/58 | Baumeister | 346—74 |
| 2,921,144 | 1/60 | Martin | 340—174.1 |
| 2,928,709 | 3/60 | Baumeister | 346—74 |
| 2,928,906 | 3/60 | Gernert | 179—100.2 |
| 2,957,051 | 10/60 | Epstein | 340—174.1 X |
| 2,972,738 | 2/61 | Sliter | 340—174.1 |

FOREIGN PATENTS

| | | |
|---|---|---|
| 784,572 | 10/57 | Great Britain. |

IRVING L. SRAGOW, *Primary Examiner.*

UNITED STATES PATENT OFFICE

CERTIFICATE OF CORRECTION

Patent No. 3,187,315

June 1, 1965

George D. Cheney

It is hereby certified that error appears in the above numbered patent requiring correction and that the said Letters Patent should read as corrected below.

Column 2, line 69, after "countersink" insert -- 24 to contain bolt 25. Only one bolt 25 is shown in the --.

Signed and sealed this 12th day of October 1965.

SEAL)
ttest:

RNEST W. SWIDER
testing Officer

EDWARD J. BRENNER
Commissioner of Patents